(12) United States Patent
Koslosky

(10) Patent No.: US 12,418,608 B1
(45) Date of Patent: Sep. 16, 2025

(54) MULTIPLE CELL PHONE HOLDER UTILIZING A MAGNET MOUNTED VERTICAL AND HORIZONTAL SUPPORT

(71) Applicant: Frank Koslosky, Gallatin, TN (US)

(72) Inventor: Frank Koslosky, Gallatin, TN (US)

( * ) Notice: Subject to any disclaimer, the term of this patent is extended or adjusted under 35 U.S.C. 154(b) by 393 days.

(21) Appl. No.: 18/116,515

(22) Filed: Mar. 2, 2023

Related U.S. Application Data

(60) Provisional application No. 63/315,167, filed on Mar. 1, 2022.

(51) Int. Cl.
| | | |
|---|---|---|
| *H04M 1/00* | (2006.01) | |
| *H04B 1/3877* | (2015.01) | |
| *H04M 1/60* | (2006.01) | |

(52) U.S. Cl.
CPC ........ *H04M 1/6075* (2013.01); *H04B 1/3877* (2013.01)

(58) Field of Classification Search
CPC .............. H04M 1/6075; H04B 1/3877
See application file for complete search history.

(56) References Cited

U.S. PATENT DOCUMENTS

| | | | |
|---|---|---|---|
| 8,827,341 B2* | 9/2014 | Sofield | B60R 7/06 |
| | | | 296/37.12 |
| 9,699,285 B1* | 7/2017 | Lundsgaard | H04M 1/6075 |
| 10,933,815 B1* | 3/2021 | Khubani | B60R 11/0241 |
| 11,297,917 B1* | 4/2022 | Malach | A45F 5/1516 |
| 2009/0294617 A1* | 12/2009 | Stacey | H04M 1/04 |
| | | | 248/316.1 |
| 2013/0075285 A1* | 3/2013 | Peng | A45C 13/005 |
| | | | 206/216 |

* cited by examiner

*Primary Examiner* — Pakee Fang
(74) *Attorney, Agent, or Firm* — John Rizvi; John Rizvi, P.A.—The Patent Professor

(57) ABSTRACT

A multiple cell phone holder is provided for retaining a first cell phone and a second cell phone perpendicular to the first cell phone. The multiple cell phone holder generally includes a primary cell phone holder, a secondary cell phone holder and connector assembly for holding the secondary cell phone holder perpendicular to the primary cell phone holder. The connector assembly is rotatably mounted relative to the primary cell phone holder. The primary cell phone holder includes one or more magnets to secure a first cell phone to the primary cell phone holder. The secondary cell phone holder includes a clamp assembly having a primary clamp and a secondary clamp and an adjustment mechanism to move the secondary clamp relative to the primary clamp to secure a second cell phone therebetween.

15 Claims, 8 Drawing Sheets

MULTIPLE CELL PHONE HOLDER UTILIZING A MAGNET MOUNTED VERTICAL AND HORIZONTAL SUPPORT

FIELD OF THE INVENTION

The present invention relates generally to cell phone holders and cases, and more particularly, to a multiple cell phone holder for releasably holding two cell phones together.

BACKGROUND OF THE INVENTION

Cellular phones or cell phones are common electronic communications devices used for contacting other individuals. Newer or smart phones also can contain various programs such as, for example, accounting programs, navigational programs, games, etc. The cell phones are often carried in cases or cell phone holders for ease of transport and use.

Cell phone technology is constantly improving often requiring a user to upgrade or get a newer model cell phone. This can pose a problem where the user has valuable information on a first cell phone that is difficult or inconvenient to copy over onto a newer second cell phone. Thus, the user often needs to carry two cell phones with them.

Additionally, in many professions, it is often necessary to carry two separate cell phones. For example, it is often necessary to carry one cell phone for business and another cell phone for personal use. This requires the user to carry two separate cell phone cases or holders.

Still further, a user may wish to simultaneously use one cell phone for communication with a first party and a second cell phone for viewing data on a cell phone program. Often these programs are best viewed on a cell phone screen horizontally or in landscape mode and the communication with the first party is best viewed on the other cell phone vertically in portrait mode.

Accordingly, there is need for a solution to at least one of the aforementioned problems. For instance, there is an established need for a cell phone holder that can carry multiple phones. There is a further established need for a multiple cell phone holder that can hold one cell phone at an angle relative to another cell phone.

SUMMARY OF THE INVENTION

The present invention is directed to a multiple cell phone holder for retaining a first cell phone and a second cell phone perpendicular to the first cell phone. The multiple cell phone holder generally includes a primary cell phone holder, a secondary cell phone holder and connector assembly for holding the secondary cell phone holder perpendicular to the primary cell phone holder. The connector assembly is rotatably mounted relative to the primary cell phone holder. The primary cell phone holder includes one or more magnets to secure a first cell phone to the primary cell phone holder. The secondary cell phone holder includes a clamp assembly having a primary clamp and a secondary clamp and an adjustment mechanism to move the secondary clamp relative to the primary clamp to secure a second cell phone therebetween.

In a first implementation of the invention, a multiple cell phone holder is provided for carrying two cell phones, the multiple cell phone holder comprising:
a primary cell phone holder including a vertical support, a horizontal support attached to said vertical support and at least one magnet mounted on said vertical support for engagement with a first cell phone;
a secondary cell phone holder including a primary clamp, a secondary clamp, and an adjustment mechanism for moving said secondary clamp relative to said primary clamp to retain a second cell phone therebetween; and
a connector assembly for movably mounting said secondary cell phone holder to said primary cell phone holder, wherein said secondary cell phone holder is mounted perpendicular to said primary cell phone holder.

In a second aspect, the secondary cell phone holder is rotatably mounted relative to said primary cell phone holder.

In another aspect, said connector assembly includes an attachment pin rotatably mounted to said primary cell phone holder.

In another aspect, said attachment pin is rotatably mounted in a housing on said vertical support of said primary cell phone holder.

In another aspect, said attachment pin is removable from said housing on said vertical support.

In another aspect, said secondary cell phone holder is mounted to a connector plate of said connector assembly.

In another aspect, said secondary cell phone holder is mounted to said connector plate with at least one magnet positioned on said connector plate.

In another aspect, said adjustment mechanism includes an adjustment bolt extending between said primary clamp and said secondary clamp, wherein rotation of said adjustment bolt moves said secondary clamp towards and away from said primary clamp.

In another aspect, said adjustment bolt has a threaded shaft rotatably mounted in said primary clamp.

In another aspect, said adjustment mechanism further includes at least one guide rod affixed to said secondary clamp and slidably mounted within said primary clamp.

In another aspect, said primary clamp includes a compressible pad for engagement with the second cell phone.

In another aspect, said secondary clamp includes a compressible pad for engagement with the second cell phone.

In another aspect, said connector assembly includes an attachment plate pivotally mounted to said primary cell phone holder.

In another aspect, said attachment plate is pivotally mounted to said primary cell phone holder by a pivot pin.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a multiple cell phone holder for retaining a pair of cell phones perpendicular to each other.

Figure 1:
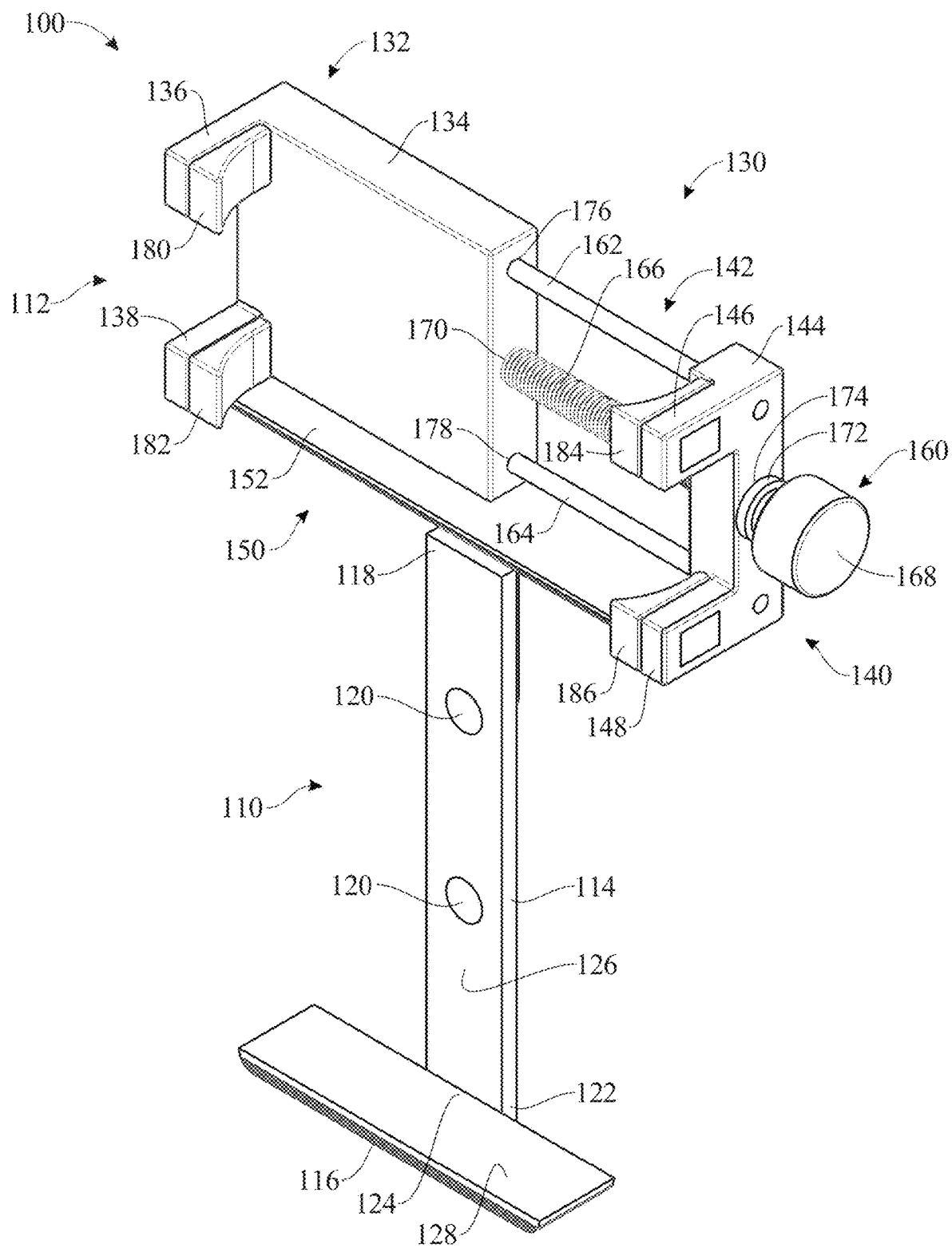
FIG. 1 presents a front isometric view of a multiple cell phone holder, for use in holding a pair of cell phones, in accordance with an illustrative embodiment of the present invention.
Figure 2:
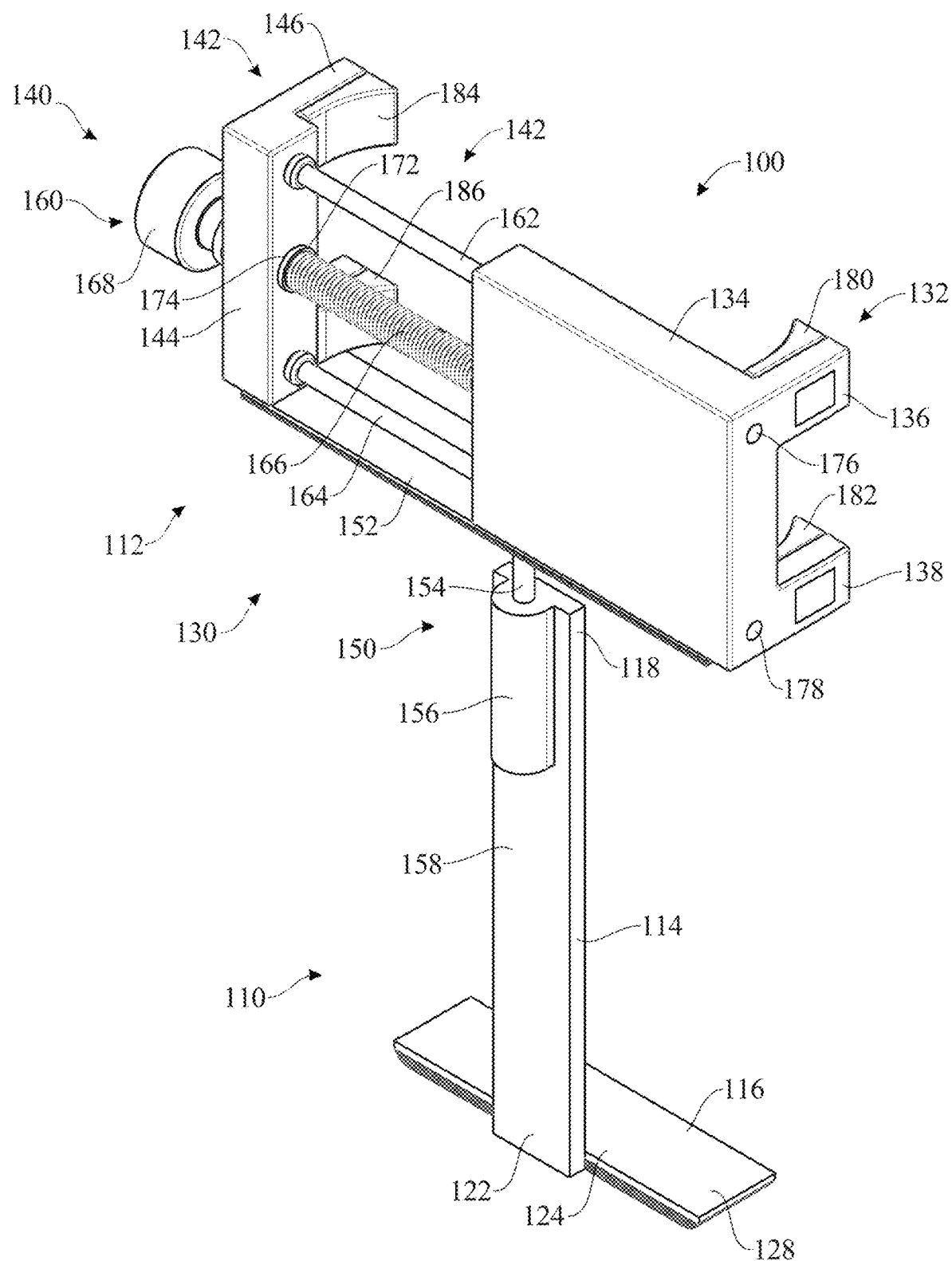
FIG. 2 presents a rear isometric view of the multiple cell phone holder in accordance with the illustrative embodiment of the present invention.

Referring to FIGS. 1-4, and initially with regard to FIGS. 1 and 2, a multiple cell phone holder for use in retaining a pair of cell phones, hereinafter multiple cell phone holder 100, is illustrated in accordance with an exemplary embodiment of the present invention. The multiple cell phone holder 100 generally includes a primary cell phone holder 110 and a secondary cell phone holder 112. The secondary cell phone holder 112 is rotatably mounted to the primary cell phone holder 110 in order to position two cell phones in different orientations relative to a user as discussed in more detail hereinbelow. The secondary cell phone holder 112 is also removably attached to the primary cell phone holder 110 to allow individual use of a cell phone without having to remove a cell phone from the multiple cell phone holder 110.

The primary cell phone holder 110 of the multiple cell phone holder 100 generally includes an elongated rectangular vertical support 114 and a shorter rectangular horizontal support 116. The secondary cell phone holder 112 of the multiple cell phone holder 100 is rotatably attached to the primary cell phone holder 110 at a top end 118 of the vertical support 114 of the primary cell phone holder 110. The primary cell phone holder 110 includes multiple magnets 120 (FIG. 1) for releasably securing a first cell phone (not shown) to the primary cell phone holder 110.

The horizontal support 116 of the primary cell phone holder 110 is attached to the vertical support 114 of the primary cell phone holder 110 at a bottom end 122 of the vertical support 114. Specifically, the bottom end 122 of the vertical support 114 is attached to a middle portion 124 of the horizontal support 116.

The vertical support 114 and the horizontal support 116 may be formed from a variety of materials, such as, for example, polymeric material, metallic materials, etc. The horizontal support 116 can be formed integrally with the vertical support 114 or may be attached to the vertical support 114 by a variety of methods, such as, for example, welding, gluing, attaching using bolts or screws, etc.

The magnets 120, holding a first cell phone on the primary cell phone holder 110, are positioned on a front surface 126 of the vertical support 114 of the primary cell phone holder 110. The magnets 120 may be attached to the vertical support 114 by gluing, welding, attaching using screws or bolts, etc. The first cell phone is held on the primary cell phone holder 110 by the magnets 120 and is supported on the front surface 126 of the vertical support 114 of the primary cell phone holder 110 and a top surface 128 of the horizontal support 116 of the primary cell phone holder 110 in a manner discussed in more detail hereinbelow.

The secondary cell phone holder 112 includes a clamp assembly 130 having an L-shaped primary clamp 132 including a rectangular base block 134 and first and second support legs 136 and 138 extending perpendicularly from the base block 134. The clamp assembly 130 additionally includes an adjustable secondary clamp 140 movably attached to the primary clamp 132 by an adjustment mechanism 142. The secondary clamp 140 generally includes a secondary clamp block 144 having first and second support legs 146 and 148 extending perpendicularly from the secondary clamp block 144. A second cell phone (not shown) is secured on the secondary cell phone holder 112 between the primary clamp 132 and the adjustable secondary clamp 140 of the clamp assembly 130 of the secondary cell phone holder 112.

The secondary cell phone holder 112 is rotatably mounted to the primary cell phone holder 110 by a connector assembly 150. The connector assembly 150 includes a connector plate 152 and an attachment pin 154 extending perpendicularly from the connector plate 152. The attachment pin 154 is rotatably mounted in a housing 156 formed on a rear surface 158 of the vertical support 114 of the primary cell phone holder 110 adjacent the top end 118 of the vertical support 114. This allows the secondary cell phone holder 112 to be rotated relative to the primary cell phone holder 110.

The secondary cell phone holder 112 is releasably connected to the connector plate 152 of the connector assembly 150 by one or more magnets (not shown) similar to those used in the primary cell phone holder 110. This allows the secondary cell phone holder 112 to be easily removed from the connector plate 152 of the connector assembly 150 and thus from the primary cell phone holder 110.

The adjustment mechanism 142 of the clamp assembly 130 is provided to clamp a second cell phone between the primary clamp 132 and the secondary clamp 140 of the secondary cell phone holder 112. The adjustment mechanism 142 includes an adjustment bolt 160 and a pair of guide rods 162 and 164 extending parallel to the adjustment bolt 160. The adjustment bolt 160 is rotatably mounted in the adjustable secondary clamp 140 and includes a threaded shaft 166 and an adjustment knob 168 affixed to the threaded shaft 168. The threaded shaft 168 is rotatably mounted within a threaded bore 170 (FIG. 1) of the base block 134 of the primary clamp 132 such that rotation of the adjustment bolt 160 in a first direction draws the secondary clamp 140 towards the primary clamp 132 to secure a cell phone therebetween and rotation of the adjustment bolt 160 in the opposite direction moves the secondary clamp 140 away from the primary clamp 132 to release the cell phone from the secondary cell phone holder 112.

The threaded bolt 160 is rotatably supported through the secondary clamp block 144 of the secondary clamp 140 by a support collar 172 fitted in a bore 174 extending through the secondary clamp block 144. Thus, the threaded bolt 160 is free to rotate within the secondary clamp block 144 without rotating or torquing the secondary clamp block 144.

The guide rods 162 and 164 are fixedly mounted within the secondary clamp block 144 and extend outward there from. The guide rods 162 and 164 are slidably mounted within respective bores 176 and 178 formed longitudinally through the base block 134 of the primary clamp 132. As the secondary clamp 140 is moved towards and away from the primary clamp 132, the guide rods 162 and 164 slide within the bores 176 and 178 in the base block 132 to prevent the secondary clamp 140 from twisting or rotating relative to the first clamp 132.

In order to prevent any inadvertent crushing of a second cell phone as it is clamped between the primary clamp 132 and the secondary clamp 140 of the secondary cell phone holder 112, the primary clamp 132 includes a pair of compressible pads 180 and 182. The compressible pads 180 and 182 are mounted on the first and second legs 136 and 138 of the primary clamp 132. The compressible pads 180 and 182 are formed of a foam, rubber or other compressible substance and may also have a relatively high coefficient of friction to prevent the second cell phone from sliding off of the primary clamp 132 in the event that the primary clamp 132 becomes slightly loosened from the secondary clamp 140.

Likewise, the secondary clamp 140 may also include a pair of compressible pads 184 and 186 affixed to the first and second legs 146 and 148 of the secondary clamp 140. Tightening the adjustment bolt 160 firmly clamps a second cell phone between the compressible pads 180 and 182 of the primary clamp 132 and the compressible pads 184 and 186 of the secondary clamp 140.

Figure 3:
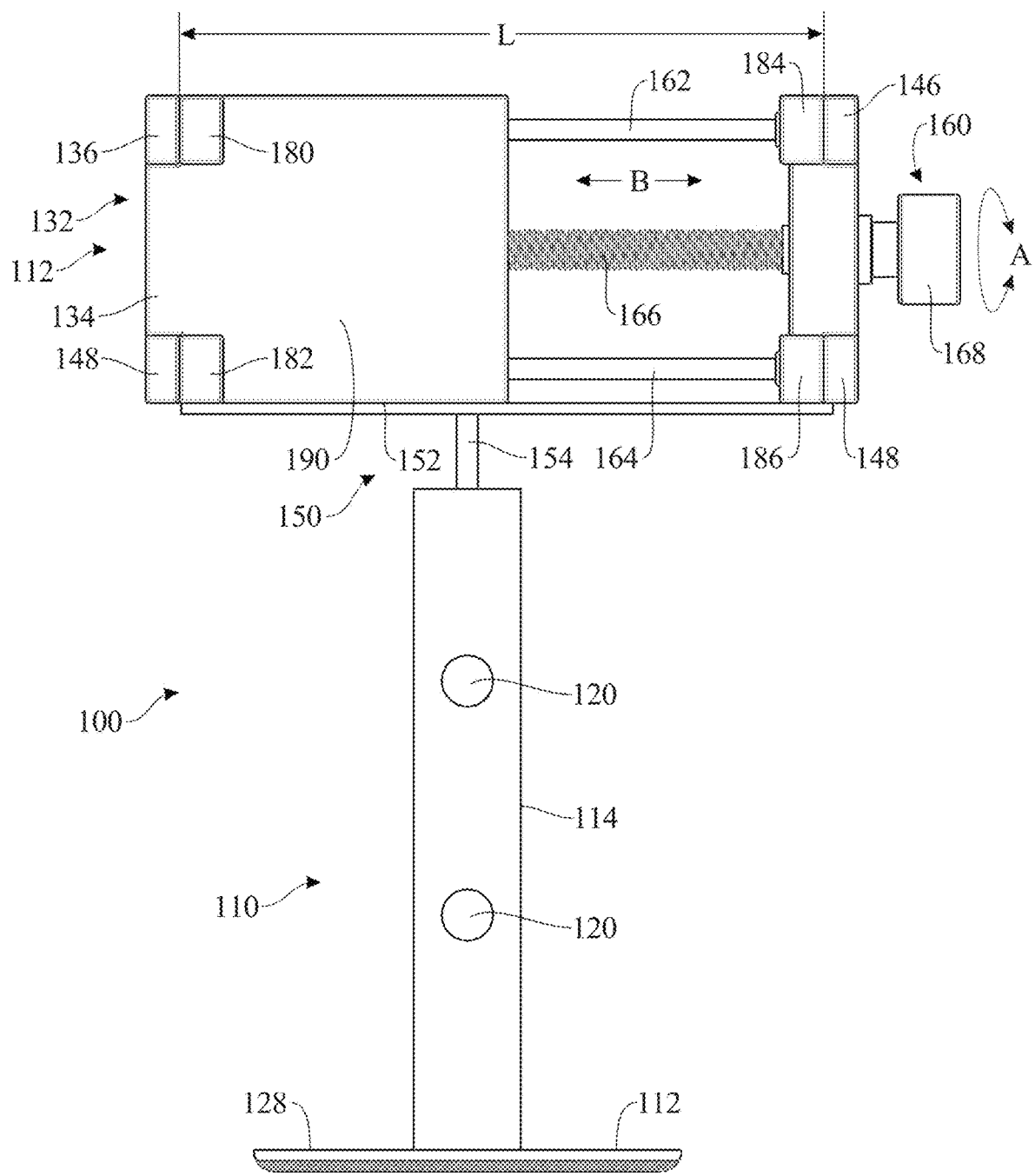
FIG. 3 presents front plan view of the multiple cell phone holder in accordance with the illustrative embodiment of the present invention.

Turning specifically to FIG. 3, the distance "L" between the first and second legs 136 of the primary clamp 132 and the first and second legs 146 and 148 of the secondary clamp 140 is adjusted by rotation of the adjustment bolt 160 in the direction of arrow "A". This moves the secondary clamp 140 of the secondary cell phone holder 112 in the direction of arrow "B" relative to the primary clamp 132 of the secondary cell phone holder 112 to clamp the second cell phone therebetween as well as accommodating cell phones of various lengths. As noted hereinabove, the guide rods 162 and 164 slide in and out of the base block 134 of the primary clamp 132 to prevent twisting of the secondary clamp 140 during the rotation of the adjustment bolt 160.

Figure 4:
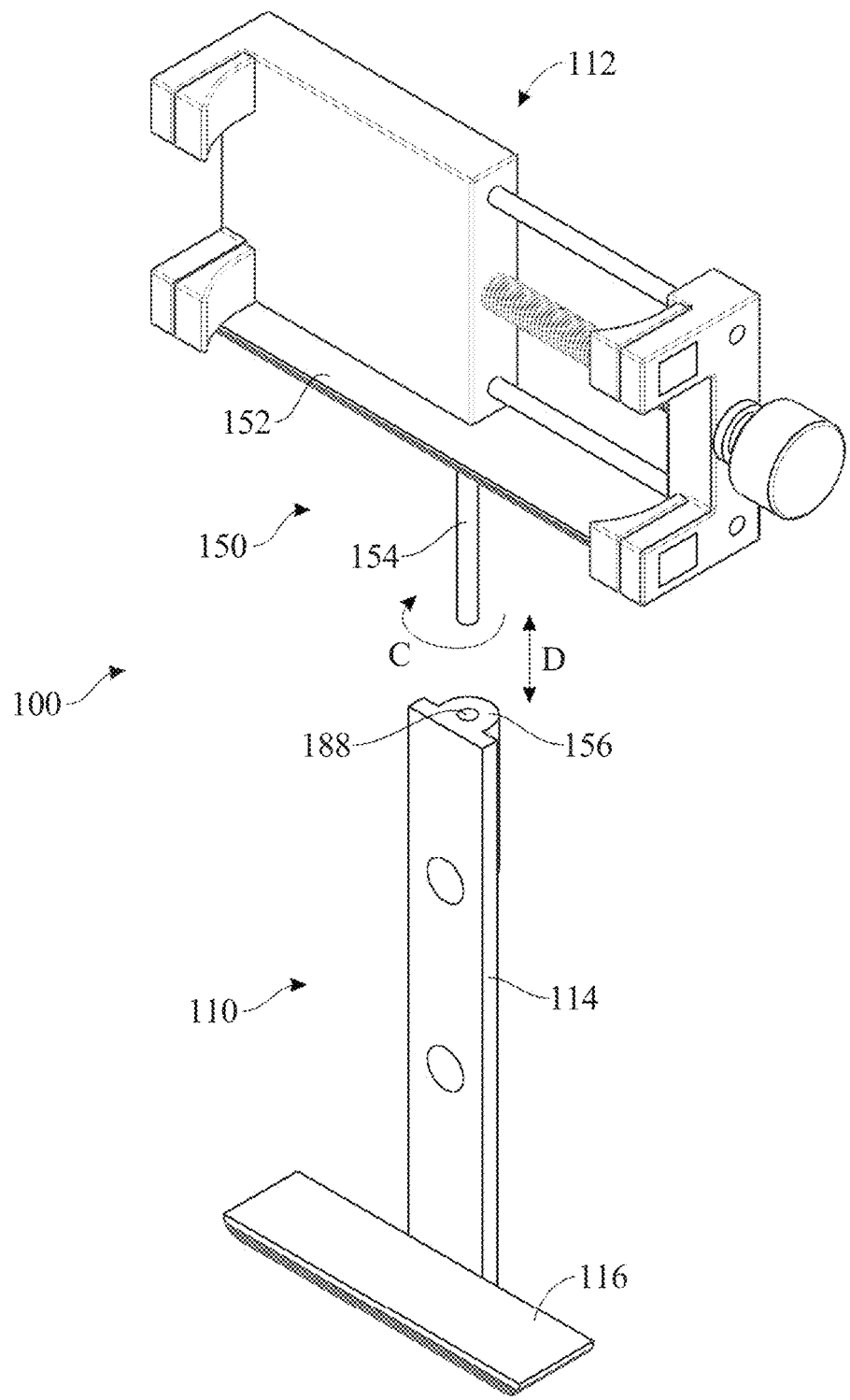
FIG. 4 presents a front isometric view, with parts separated, of the multiple cell phone holder in accordance with the illustrative embodiment of the present invention including a primary cell phone holder and a secondary cell phone holder.

Referring for the moment to FIG. 4, as noted hereinabove, in addition to being rotatable relative to the primary cell phone holder 110, the secondary cell phone holder 112 is removable from the primary cell phone holder 110. This can be accomplished in two separate ways. As described hereinabove, the secondary cell phone holder 112 may be releasably attached to the connector plate 152 of the connector assembly 150 by a magnets (not shown) mounted on the connector plate 152 in a manner similar to that used on the primary cell phone holder 110. Pulling the secondary cell phone holder 112 away from the magnets on the connector plate 152 releases the secondary cell phone holder 112 from the connector assembly 150 and thus from the primary cell phone holder 110.

Alternatively, the connector plate 152 and the attachment pin 154 of the connector assembly 150, along with the secondary cell phone holder 112, may be removed from the housing 156 of the connector assembly 150 affixed to the vertical support 114 of the primary cell phone holder 110. As shown, the attachment pin 154 is rotatably mounted within a bore 188 of the housing 156 mounted on the primary cell phone holder 110 for rotation of the secondary cell phone holder 112 relative to the primary cell phone holder 110 in the direction of arrow "C". Drawing the attachment pin 154 out of the bore 188 of the housing 156 in the direction of arrow "D" also releases the secondary cell phone holder 112 from the primary cell phone holder 110.

Figure 5:
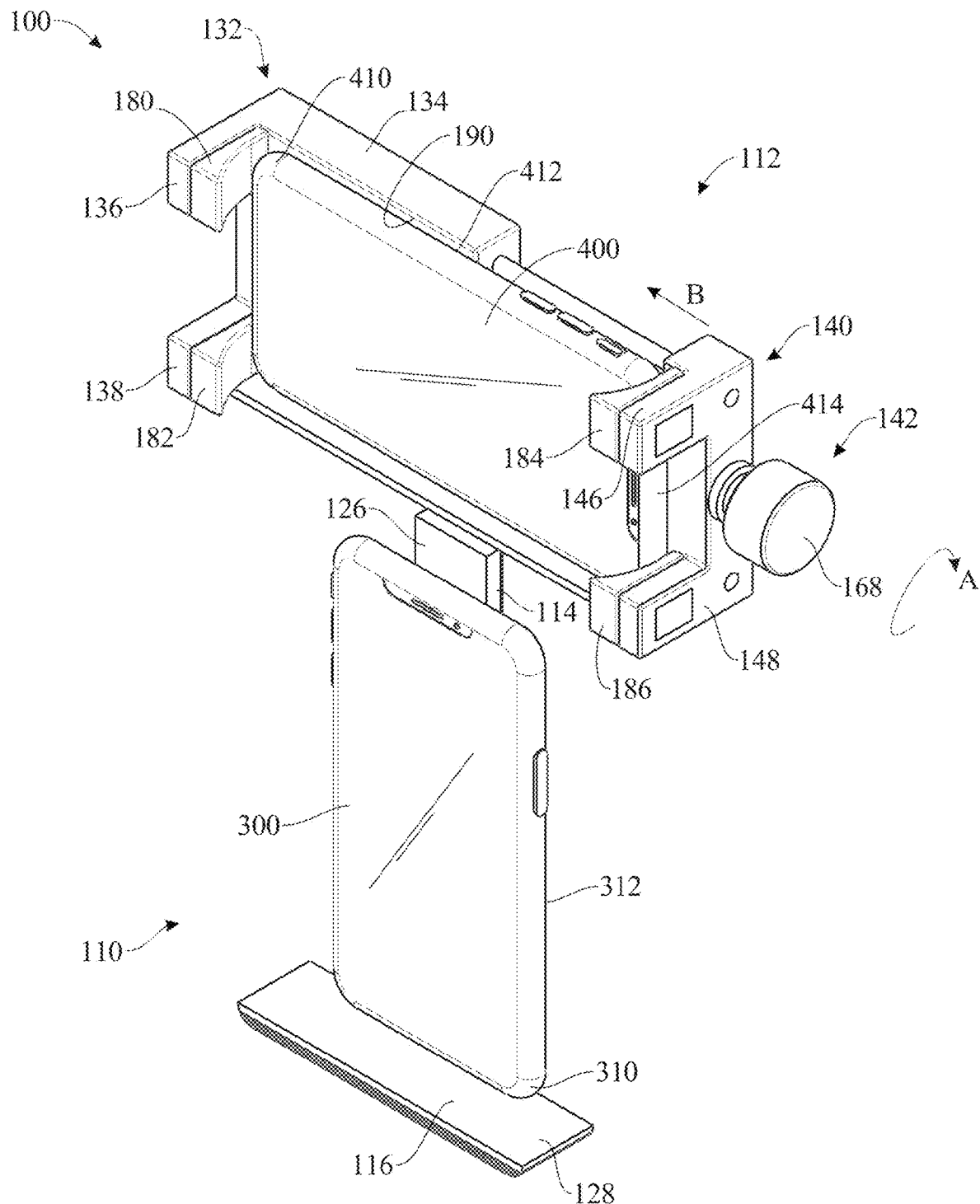
FIG. 5 presents a front isometric view of the of the multiple cell phone holder illustrated in FIG. 1 in accordance with the illustrative embodiment of the present invention with a first cell phone positioned in the primary cell phone holder of the multiple cell phone holder and a second cell phone positioned in the secondary cell phone holder of the multiple cell phone holder.
Figure 6:
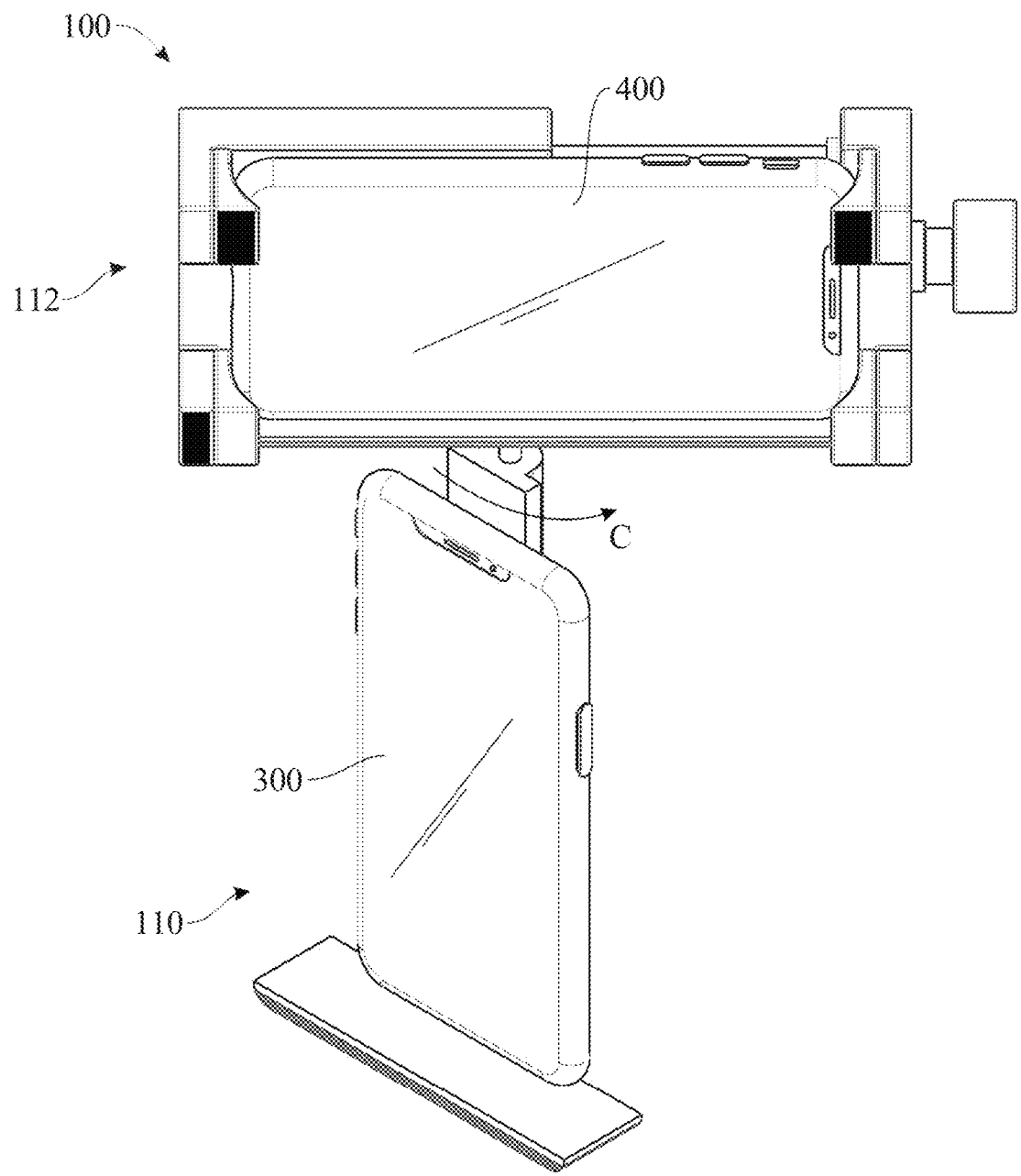
FIG. 6 presents a front isometric view, similar to FIG. 5, with the secondary cell phone holder of the multiple cell phone holder rotated relative to the primary cell phone holder of the multiple cell phone holder to position the secondary cell phone at an angle relative to the primary cell phone.

Referring now to FIGS. 3, 5 and 6, the use of the multiple cell phone holder 100, including the primary cell phone holder 110, the secondary cell phone holder 112 and the connector assembly 150, to retain a pair of cell phones will now be described. The multiple cell phone holder 110 is provided to hold a pair of cell phones, such as, for example, first and second cell phones 300 and 400, respectively, as a single unit and allow the first and second cell phones 300 and 400 to be rotated relative to each other.

To assemble the first cell phone 300 to the primary cell phone holder 110 of the multiple cell phone holder 100, the first cell phone 300 is positioned on the primary cell phone holder 110 such that a bottom end 310 of the first cell phone 300 rests on the top surface 128 of the horizontal support 116 of the primary cell phone holder 110 and a back surface 312 of the first cell phone 300 rests against the front surface 126 of the vertical support 114 of the primary cell phone holder 110. The first cell phone 300 is releasably secured to the primary cell phone holder 110 by the magnets 120 (FIG. 3) on the vertical support 114 of the primary cell phone holder 110.

In order to secure the second cell phone 400 to the secondary cell phone holder 112, the adjustment mechanism 142 is used to separate the primary clamp 132 from the secondary clamp 140 a sufficient length L (FIG. 3) to allow the second cell phone 400 to be positioned between the primary and secondary clamps 132 and 140, respectively. A first or bottom end 410 of the second cell phone 400 is initially positioned against the first and second legs 136 and 138 of the primary clamp 132. More specifically, the bottom end 410 of the second cell phone 400 is positioned against the compressible pads 180 and 182 on the first and second legs 136 and 138, respectively. A back surface 412 of the second cell phone 400 is positioned against a front surface 190 of the base block 134 of the primary clamp 132 and the adjustment bolt 160 is rotated by turning the adjustment knob 168 in the direction of arrow "A" to draw the secondary clamp 140 towards the primary clamp 132 in the direction of arrow "B" (FIG. 3).

As the adjustment bolt 160 draws the secondary clamp 140 towards the primary clamp 132, the compressible pads 184 and 186 on the first and second legs 146 and 148 of the secondary clamp 140 engage a second or top end 414 of the second cell phone 400 such that the second cell phone 400 is captured within the clamp assembly 130 of the secondary cell phone holder 112. As noted above, the compressible pads 180, 182, 184 and 186 are provided to prevent crushing of the second cell phone 400 as the adjustment bolt 160 is operated to secure the second cell phone 400 within the secondary cell phone holder 112.

As best shown in FIG. 5, when the first and second cell phones 300 and 400 are releasably secured to the multiple cell phone holder 110, the second cell phone 400 is held orthogonal or perpendicular to the first cell phone 300. This allows a user to easily operate two cell phones in close proximity on a single cell phone holder. For example, a user may wish to retain an older cell phone containing programs, photos, contact lists, for example the second cell phone 400, for ease of access while simultaneously utilizing features on a newer cell phone for example the first cell phone 300. Alternatively, it allows a user to easily communicate over two cell phones at the same time. For example, the first cell phone 300 may be used for secure communications with a relative, friend, client, etc. while the second cell phone is being used for a zoom meeting, consultation with other persons, etc. Thus, the multiple cell phone holder 100 permits a user to easily carry two cell phones together for simultaneous use.

With specific reference to FIG. 6, should a user wish to share a conversation with an accompanying second user, the second cell phone 400 can be rotated relative in the direction of arrow "C" relative to the first cell phone 300 to better position the second cell phone 400 to the second user. Additionally, the ability of the multiple cell phone holder 100 to rotate one cell phone holder, for example, the second cell phone holder 112 relative to the other allows the user to use one cell phone, for example the first cell phone 300, for communications while taking pictures with the other cell phone, for example the second cell phone 400.

Finally, the ability of the multiple cell phone holder 100 to easily retain two cell phones and subsequently detach them from each other by separating the second cell phone holder 112 from the first cell phone holder 110 allows the user to carry one or both cell phones at a time. Both the first and second cell phones 300 and 400, may also be held by the multiple cell phone holder 100 at a single location for ease of charging.

Figure 7:
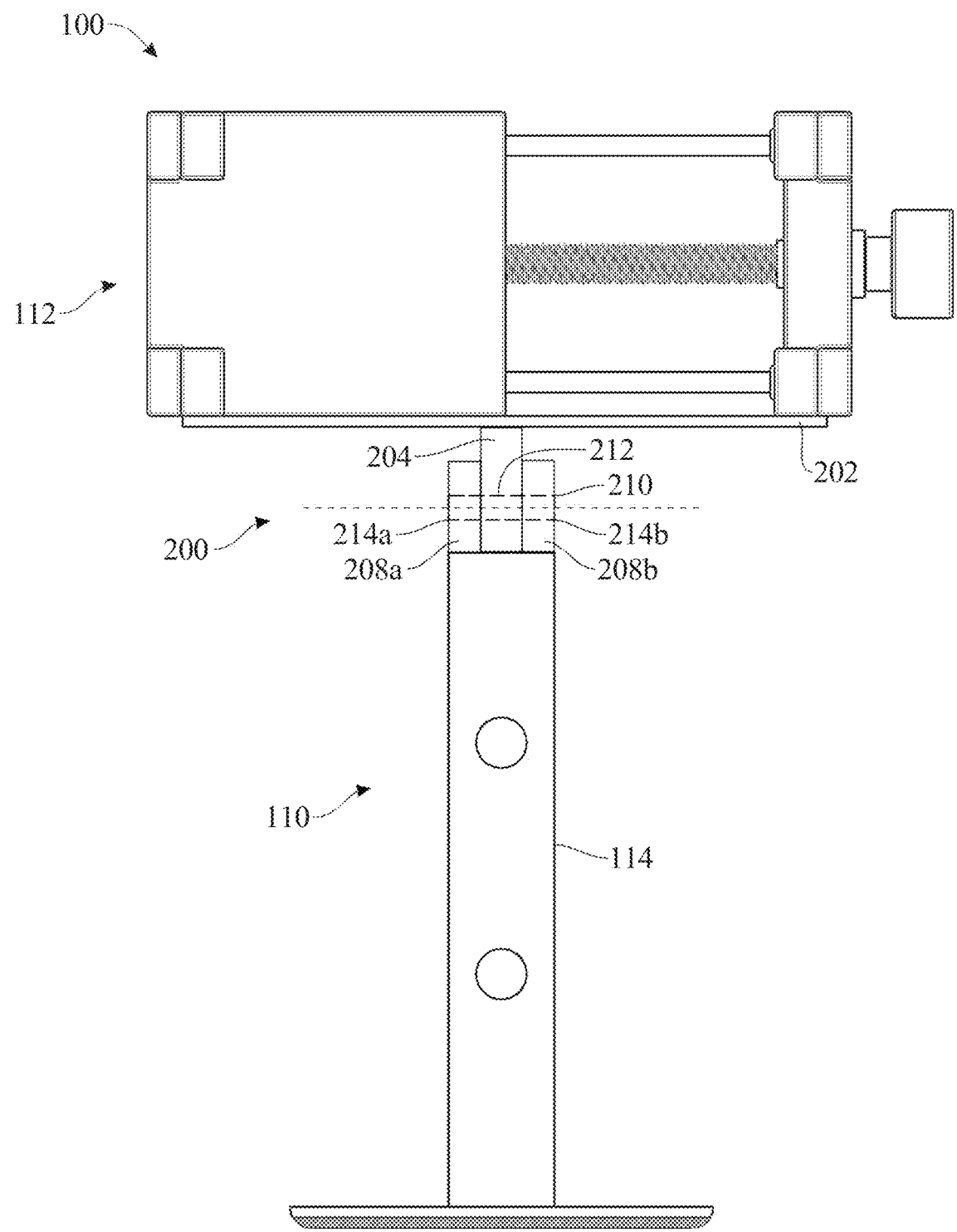
FIG. 7 presents a front plane view of the multiple cell phone holder incorporating an alternative embodiment of a connector assembly for pivotally connecting the primary cell phone holder to the secondary cell phone holder.
Figure 8:
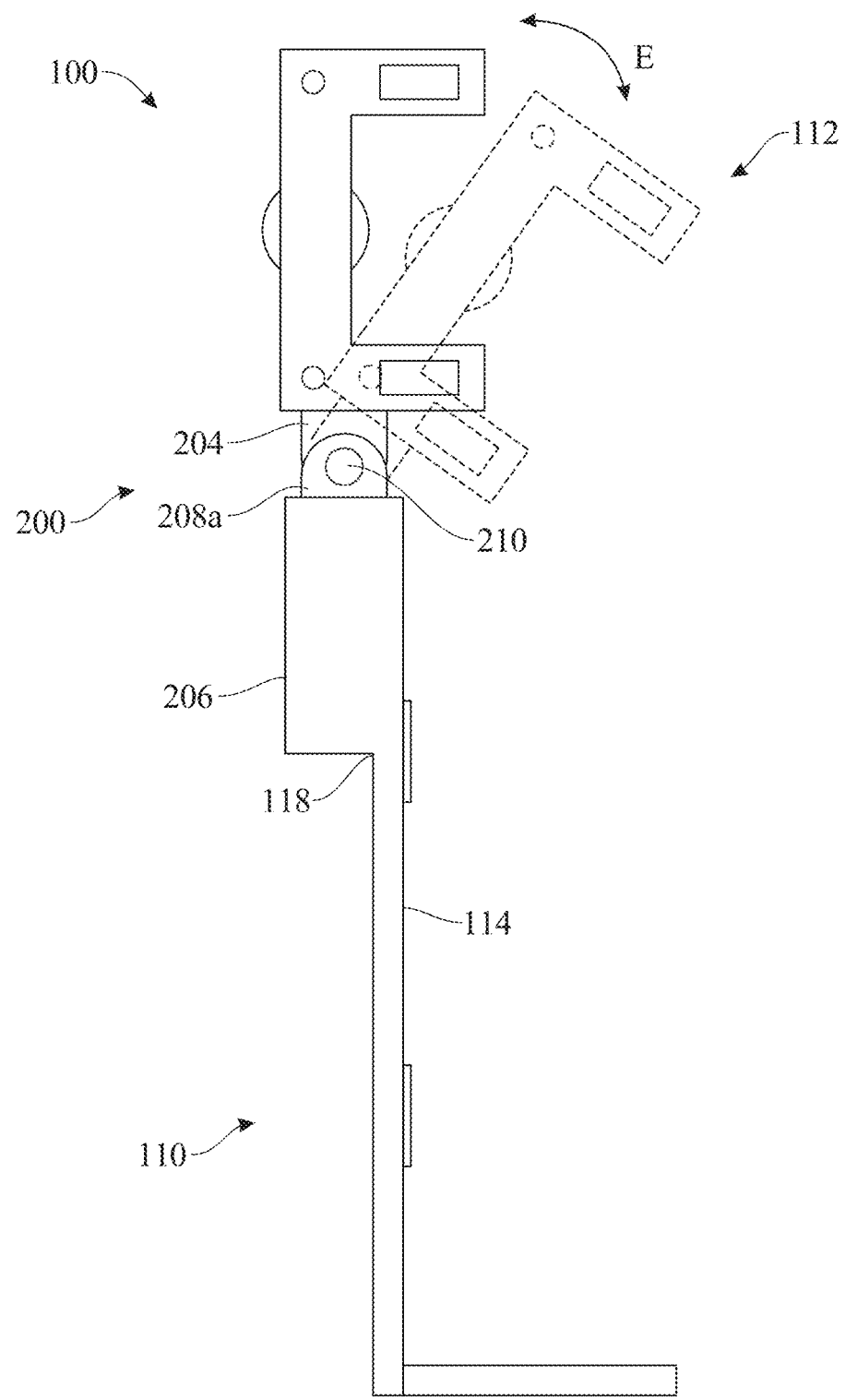
FIG. 8 presents a side plane view of the multiple cell phone holder with the secondary cell phone holder pivoted forward relative to the primary cell phone holder.

Referring now to FIGS. 7 and 8, and initially with regard to FIG. 7, there is disclosed an alternative connector assembly 200 for use in the multiple cell phone holder 100. The connector assembly 200 allows the secondary cell phone holder 112 to pivot or rotate forward and back relative to the primary cell phone holder 100. As shown, the connector assembly 200 generally includes a connector plate 202 for supporting the secondary cell phone holder 112 and an attachment pin or plate 204 affixed to and extending from the connector plate 202.

In this embodiment of the connector assembly 200, the connector assembly 200 includes a housing 204 affixed to or formed integrally with the vertical support 114 of the primary cell phone holder 110. Specifically, the housing 204 is provided at the top end 118 (FIG. 8) of the vertical support 114 of the primary cell phone holder 110. The connector assembly 200 further includes a pair of semi-circular ears 208a and 208b extending upward from the housing 104. The semi-circular ears 208a and 208b may be attached to the housing 204 in known manner or may be formed integrally therewith.

The connector plate 202 supporting the secondary cell phone holder 112 is pivotally connected to the housing 204 extending from the primary cell phone holder 110 by a pivot pin 210. This allows the secondary cell phone holder 112 to pivot forward and back relative to the primary cell phone holder 110. The pivot pin 210 extends through a bore 212 in the connector plate 204 and through respective holes 214a and 214b formed through the semi-circular ears 208a and 208b.

With reference to FIG. 8, the secondary cell phone holder 112 can pivot forward and back about the pivot pin 210 in the direction of arrow "E" relative to the primary cell phone holder 110. This allows a user to point the secondary cell phone 400 (FIG. 6) mounted on the second cell phone holder 112 up or down relative to the first cell phone 300 retained on the primary cell phone holder 110.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A multiple cell phone holder for carrying two cell phones, the multiple cell phone holder comprising: a primary cell phone holder including a vertical support, a horizontal support attached to said vertical support and at least one magnet mounted on said vertical support for engagement with a first cell phone; a secondary cell phone holder including a primary clamp, a secondary clamp, and an adjustment mechanism for moving said secondary clamp relative to said primary clamp to retain a second cell phone therebetween; a connector assembly for movably mounting said secondary cell phone holder to said primary cell phone holder, wherein said secondary cell phone holder is mounted perpendicular to said primary cell phone holder; wherein said secondary cell phone holder is mounted to said connector plate with at least one magnet positioned on said connector plate; wherein said adjustment mechanism includes an adjustment bolt extending between said primary clamp and said secondary clamp; wherein rotation of said adjustment bolt moves said secondary clamp towards and away from said primary clamp; wherein said adjustment bolt has a threaded shaft rotatably mounted in said primary clamp; and wherein said adjustment mechanism further includes at least one guide rod affixed to said secondary clamp.

2. The multiple cell phone holder of claim 1, wherein said secondary cell phone holder is rotatably mounted relative to said primary cell phone holder.

3. The multiple cell phone holder of claim 1, wherein said connector assembly includes an attachment pin rotatably mounted to said primary cell phone holder.

4. The multiple cell phone holder of claim 3, wherein said attachment pin is rotatably mounted in a housing on said vertical support of said primary cell phone holder.

5. The multiple cell phone holder of claim 3, wherein said attachment pin is removable from said housing on said vertical support.

6. The multiple cell phone holder of claim 1, wherein said secondary cell phone holder is mounted to a connector plate of said connector assembly.

7. The multiple cell phone holder of claim 1, wherein said at least one guide rod is slidably mounted within said primary clamp.

8. The multiple cell phone holder of claim 1, wherein said primary clamp includes a compressible pad for engagement with the second cell phone.

9. The multiple cell phone holder of claim 1, wherein said secondary clamp includes a compressible pad for engagement with the second cell phone.

10. The multiple cell phone holder of claim 1, wherein said primary clamp includes a pair of compressible pads.

11. The multiple cell phone holder of claim 10, wherein said compressible pads are mounted on a first leg and a second leg of said primary clamp.

12. The multiple cell phone holder of claim 11, wherein said compressible pads are formed of a foam, rubber or other compressible substance.

13. The multiple cell phone holder of claim 12, wherein said compressible pads may have a relatively high coefficient of friction to prevent said second cell phone from sliding off of said primary clamp.

14. The multiple cell phone holder of claim 10, wherein said secondary clamp includes a pair of compressible pads.

15. The multiple cell phone holder of claim 14, wherein an adjustment bolt firmly clamps said second cell phone between said pair of compressible pads of said primary clamp and said pair of compressible pads of said secondary clamp.

* * * * *